US005931425A

United States Patent [19]

Oliva

[11] Patent Number: 5,931,425

[45] Date of Patent: Aug. 3, 1999

[54] APPARATUS AND METHOD FOR MOUNTING AND STABILIZING ELECTRICAL JUNCTION BOXES BETWEEN WALL STUDS

[76] Inventor: John H. Oliva, 875 New Bedford Pl., Fairfield, Calif. 94533

[21] Appl. No.: 08/886,202

[22] Filed: Jul. 1, 1997

[51] Int. Cl.[6] .................................................... F04G 25/00

[52] U.S. Cl. ......................... 248/200.1; 248/906; 174/58

[58] Field of Search ................................ 174/53, 54, 58, 174/63, 50; 248/200.1, 205.1, 909, 906, 546, 343, 27.1, 57; 220/3.9, 3.5

[56] References Cited

U.S. PATENT DOCUMENTS

| | | | |
|---|---|---|---|
| 1,211,182 | 1/1917 | Kruse | 248/218.4 |
| 1,288,024 | 12/1918 | Kendig | 220/3.9 |
| 1,814,449 | 7/1931 | Morgenstern | 220/3.9 |
| 1,850,616 | 3/1932 | Barnett | 220/3.9 |
| 3,039,729 | 6/1962 | Nagle | 248/343 |
| 3,917,899 | 11/1975 | Oliver | 174/57 |
| 4,757,967 | 7/1988 | Delmore et al. | 248/218.4 |
| 4,964,525 | 10/1990 | Coffey et al. | 220/3.9 |
| 4,967,990 | 11/1990 | Rinderer | 248/205.1 |
| 5,114,105 | 5/1992 | Young | 248/27.1 |
| 5,330,137 | 7/1994 | Oliva | 248/27.1 |

*Primary Examiner*—Ramon O. Ramirez
*Assistant Examiner*—Gwendolyn Baxter
*Attorney, Agent, or Firm*—Michael L. Louie; Beyer & Weaver, LLP

[57] ABSTRACT

A mounting bracket including a flat elongated frame having front and rear faces and opposing ends for attaching to adjacent wall studs. The bracket has a central cut-out portion which defines top and bottom members. The open front end of an electrical box is placed flush against the rear face of the bracket and contacts the top and bottom members of the bracket. The front face of the box is substantially flush with the plane formed by the wall studs regardless of the depth of the box. Boxes are stabilized against disorientation relative to the cut-out portion by upper and lower spaced-apart tabs that protrude from the rear face at a selected angle to engage the upper and lower surfaces of the box. An accompanying faceplate is placed on the front face of the bracket opposite and aligned with the box and in contact with the top and bottom members. The faceplate is fastened to the box with the bracket disposed between box and faceplate, and with upper and lower forward edges of the box in contact with the protruding tabs on the rear face of the bracket. Measurement rules may be marked on the front faces of the upper and lower members to facilitate convenient location of one or more electrical boxes within the cut-out portion of the bracket.

12 Claims, 3 Drawing Sheets

SECTION A–A

APPARATUS AND METHOD FOR MOUNTING AND STABILIZING ELECTRICAL JUNCTION BOXES BETWEEN WALL STUDS

RELATED CASE

The subject matter of this application is related to the subject matter of U.S. Pat. No. 5,330,137 which is incorporated herein by this reference.

FIELD OF THE INVENTION

This invention relates to mechanical brackets for mounting electrical boxes between studs in a wall and more specifically to a mounting bracket which allows electrical junction boxes having different depths to be mounted on the same bracket, and which stabilizes boxes so mounted from positional disorientation within the bracket.

BACKGROUND OF THE INVENTION

Brackets for mounting electrical boxes between wall studs are commonly used to conveniently traverse the space between the studs and mount an electrical box at any location in the space between adjacent studs. (See, for example, U.S. Pat. No. 4,967,990).

In mounting bracket applications, it is desirable for the front of the electrical box, after mounting, to be substantially flush with the front portions of the two studs. This is because wall board is commonly set against the front of the two studs, and it is desirable for the front of the electrical box to be substantially flush with that section of wall. Conventional mounting brackets fulfills this requirement adequately when all of the boxes have the same depth. However, when boxes of differing depths are to be mounted, conventional brackets fail to provide satisfactory results. Because boxes of various depths are used regularly in the construction industry, it is important for a mounting bracket to be capable of accommodating boxes having different depths. Also, it is desirable to accommodate junction boxes of different widths and mounting schemes in such versatile manner that the box remains firmly positioned without dislocations or skew offsets as the wall is being completed.

SUMMARY OF THE INVENTION

In accordance with the present invention, an improved mounting bracket includes a flat, elongated frame having a front face, a rear face, first and second opposing ends attachable to wall studs, and a central cut-out portion defining a top member and a bottom member of the bracket. The top and bottom members of the bracket above and below the cut-out are preferably bent or otherwise formed as a rearward recess with a lineal shoulder along the rear top and bottom edges of the bracket to provide a 'referencing' edge or shoulder for wide junction boxes to inhibit angular skewing or positional dislocation when installed adjacent the cut out portion of the bracket. Each of the opposing ends of the frame preferably includes a surface which is elevated above and substantially parallel to the front face of the frame. In another embodiment, tabs are provided along top and bottom edges of the frame for selective bending into registration with the overall height of junction boxes of different dimensions.

In use, the bracket of the present invention preferably is attached between two wall studs with the front face of the frame substantially flush with the plane formed by the two studs. Once attached to the studs, the bracket may be used to mount one or more electrical junction boxes. Each electrical box is preferably of conventional construction comprising a plurality of sides, a back end and an open front face. To mount the electrical box to the frame, the open front face of the box is placed flush against the rear face of the frame and positioned with a top front edge of the box in contact with the lineal shoulder along the rear, top edge of the bracket, and with the bottom front edge of the box in contact with the lineal shoulder along the rear bottom edge of the bracket. Alternatively, a selection of tabs formed along the top and bottom edges of the bracket may be bent rearwardly to provide referencing shoulders for the size of junction box being mounted. A faceplate associated with the box is placed against the front face of the frame opposite and in alignment with the electrical box and positioned with a top portion of the faceplate in contact with the top member of the frame, and with a bottom portion in contact with the bottom member of the frame. To complete the mounting, the electrical box is fastened to the faceplate, preferably by means of screws or bolts. Because the electrical box and the faceplate sandwich the frame, fastening the electrical box to the faceplate secures the box to the faceplate and also secures the box and the faceplate to the frame. In addition, the recessed edges, or selection of bent tabs, along substantially the entire top and bottom edges of the frame serve to stabilize large electrical boxes at any position along the frame against disorientation relative to the bracket, and such recess edges or shoulders additionally serve as stiffeners over a substantial portion of the entire length of the bracket between studs.

DETAILED DESCRIPTION OF THE PREFERRED EMBODIMENT

Figure 2:
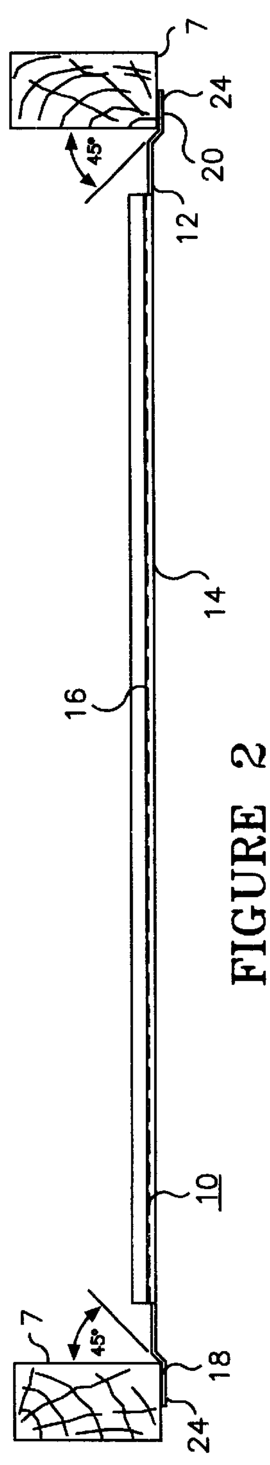
FIG. 2 is a side view of the mounting bracket shown in FIG. 1.
Figure 1:
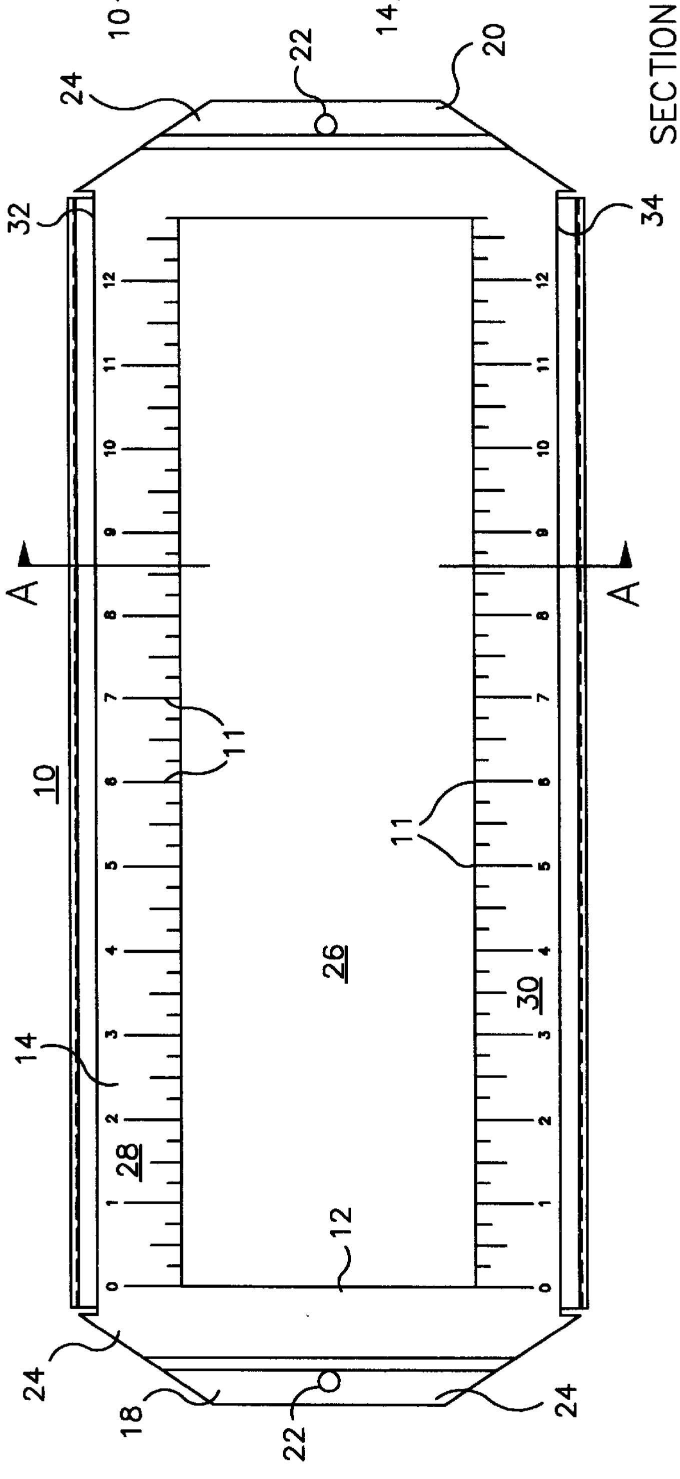
FIG. 1 is a front view of one embodiment of the mounting bracket of the present invention.

Referring to FIGS. 1 and 2, there are shown frontal and side views, respectively, of one embodiment of the mounting bracket of the present invention. The bracket 10 is a substantially flat and elongated frame 12 that is preferably constructed of a relatively rigid material. The rigidity of the material provides the frame 12 with the necessary structural strength. For brackets formed of metal, electrical conductivity enables the frame 12 to function as an electrical ground. As an example, frame 12 may be constructed of 20 gauge galvanized sheet metal, and may include rule markings 11 stamped or printed or otherwise formed on the front surface of the bracket 10 for convenient placement of electrical boxes thereon. Alternatively, the frame may be extruded of plastic or aluminum for subsequent bending and punching out of the central cut-out region 26 and mounting holes 22.

Frame 12 comprises a front face 14, a rear face 16, and first 18 and second 20 opposing ends, each end preferably having a hole 22 therein for receiving a nail or other fastener therethrough for attaching the frame 12 to a corresponding wall stud 7. Each of the ends 18, 20 preferably has a flat surface 24 which is bent forward from the body of the frame 12. The surface 24 is elevated above the front face 14 of the frame 12 and is substantially parallel thereto, as shown in FIG. 2, wherein the surface 24 is shown elevated above the front face 14 of the frame 12. The distance by which the surface 24 is raised above the front face 14 is determined by the thickness of the faceplate which is attached to the frame and the size of the head of the screw which is used to attach the faceplate to the frame. Although this distance may vary depending upon the faceplate and the screw used, it is preferably about 0.5 centimeters. The rearward side of surface 24 at each end of the frame 12 contacts a corresponding wall stud. Because wall studs are typically separated by center-to-center distances of either sixteen or twenty-four inches, the two elevated surfaces 24 are also preferably separated appropriately at the ends of correspondingly shorter or longer frames 12 for mounting on adjacent studs 7 spaced on either sixteen or twenty-four inch centers.

In the central part of the frame 12, the substantial cut-out portion 26 defines a top member 28 and a bottom member 30 of the frame. The cut-out portion 26 preferably has a height of between three inches and three and one half inches to correspond with the height of the open front face of a typical electrical box.

Figure 3:
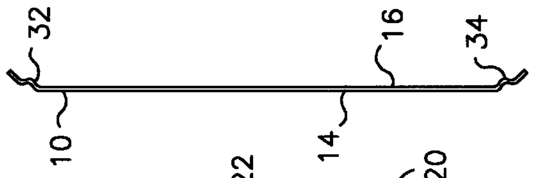
FIG. 3 is a sectional view of the mounting bracket of the present invention.

Stabilizing or referencing lineal shoulder 32, 34 at the top and bottom edges of the frame enhance the structural rigidity of the frame 12 and provide reference edges for engaging corresponding top and bottom forward edges of an electrical box. The entire top edge of top member 28 is preferably bent backward at substantially a right angle with respect to the front face 14 of the frame 12, and is then bent outward at substantially right angle (or plane parallel to the front face) in order to form a recess in the front face and the lineal shoulder 32 in the rear face of the frame 12, as shown in FIG. 3. Similarly, the entire bottom edge of the bottom member 30 is also preferably bent backward at substantially a right angle with respect to the front face 14 of the frame 12, and is then bent outward at substantially right angle (or plane parallel to the front face) in order to form a recess in the front face and the lineal shoulder 34 in the rear face of the frame, as shown in FIG. 3. These recesses along substantially the entire lengths of the upper and lower edges of the frame impart to the frame an enhanced structural rigidity to resist both torsional forces and bending forces. Of course, such lineal shoulders 32, 34 on the rear face may be formed, for example, by extruding a length of material with the shoulders 32, 34 integrally formed thereon near the upper and lower rear edges, for final fabrication by forming the ends 18, 20, and punching the holes 22 and the cut-out 26.

The corners of the mounting surfaces are beveled to allow nails to be driven into supporting studs 7 at locations where the corners would otherwise be present. Since a large number of structures are commonly nailed or otherwise attached to the studs, the beveled corners expose as much of the supporting studs as possible to accommodate the nailing of other structures.

Figure 4:
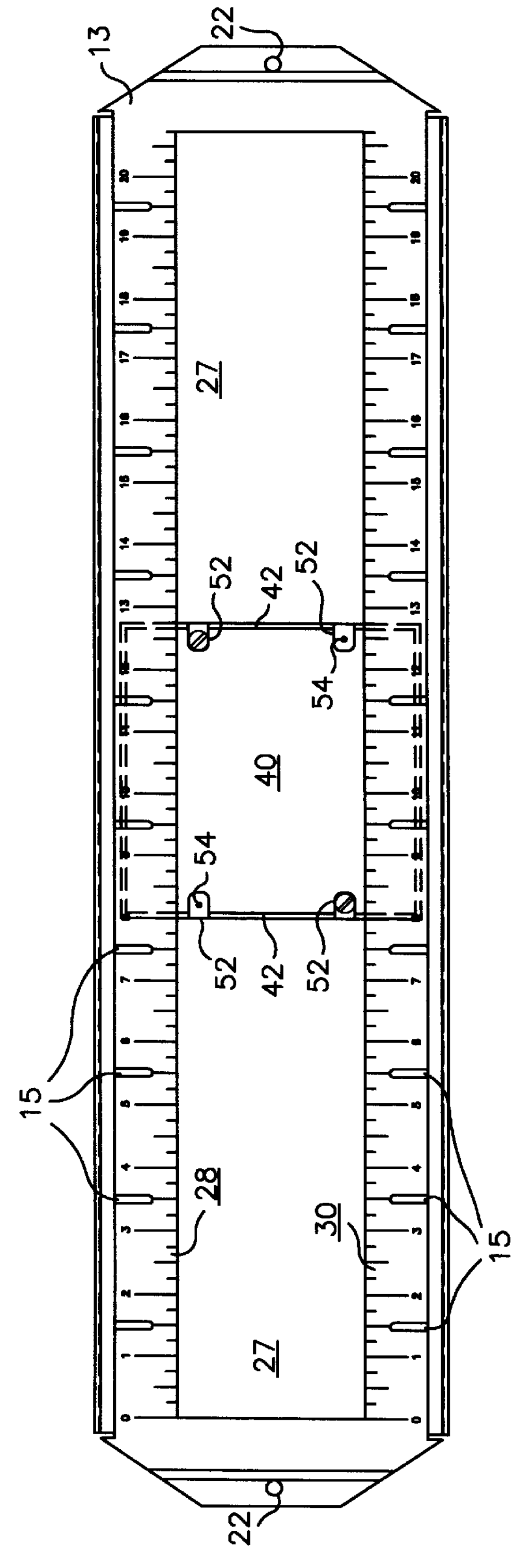
FIG. 4 is a front view of another embodiment of the present invention including a plurality of tabs for selective placement against top and bottom surfaces of a junction box.
Figure 5:
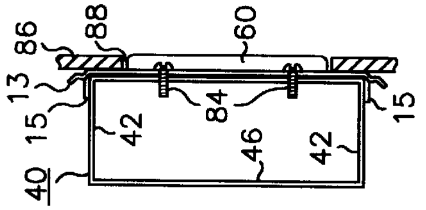
FIG. 5 is a side cross-sectional view of the bracket of FIG. 4 with an electrical box mounted on the bracket.

Referring now to the front view of FIG. 4, there is shown another embodiment of a bracket 13 of similar configuration to the bracket 10 of FIGS. 1, 2, and 3, additionally with a plurality of tabs 15 pre-punched along the upper and lower edges of the bracket. Each such tab remains attached to the frame via an in-tact base, as shown in FIG. 5, that permits convenient bending of selected ones of the tabs 15 substantially at right angles to the face of the bracket, or at lesser angles as later described herein.

Figure 6:
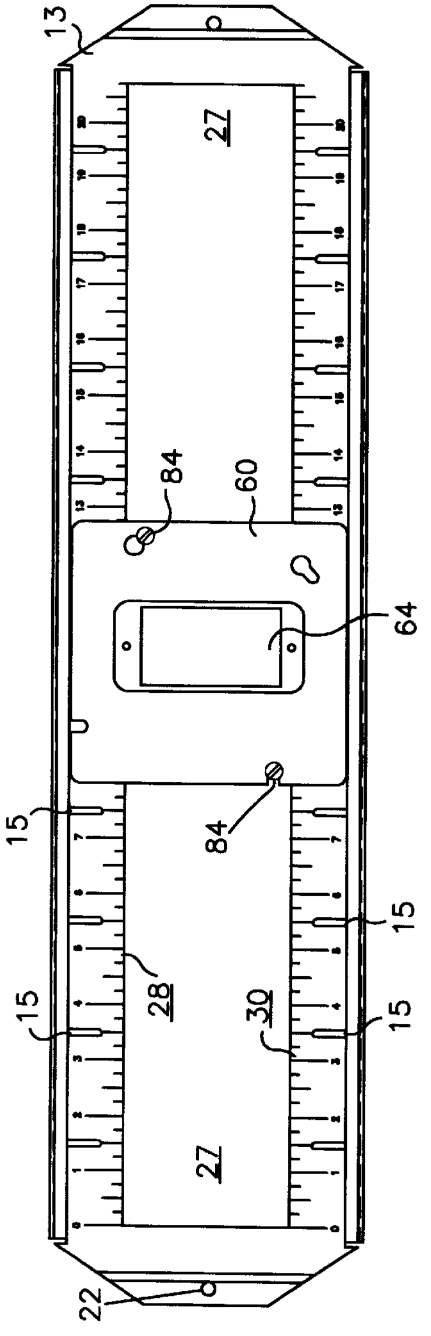
FIG. 6 is a front view of the embodiment of the bracket illustrated in FIG. 4 showing an installed face plate.

The mounting brackets 10, 13 of the present invention thus far described may be used to conveniently mount one or more electrical boxes between two adjacent wall studs 7. A typical electrical box 40 and an accompanying faceplate 60 may be mounted to bracket 10, 13, as shown in FIGS. 5 and 6. The electrical box 40 is preferably of standard construction comprising a plurality of sides 42 having a selected depth, a back end 46, and an open front face. The back end 46 and one or more sides typically include a plurality of pop-out sections which may be removed to provide access into the interior of the box through such pop-outs. Selected ones of the tabs 15 of bracket 13 near where a junction box is to be mounted may be conveniently bent rearwardly above and below the top and bottom forward edges of the junction box 40 to about a right angle, as shown in FIG. 5, in order to stabilize the junction box 40 against disorientation relative to the cut out 27 and bracket 13.

Figure 8:
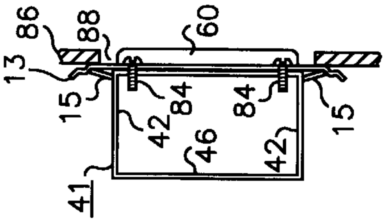
FIG. 8 is a side sectional view of the embodiment of FIG. 7 illustrating different tab placement relative to the size of the junction box.
Figure 7:
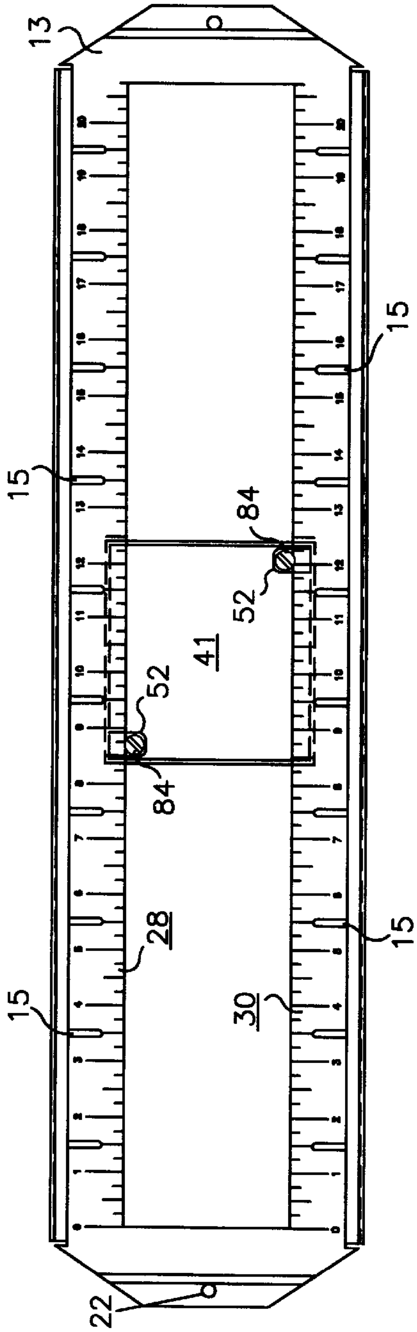
FIG. 7 is a front view of the embodiment of FIG. 4 illustrating an attached junction box of different configuration.

Alternatively, as shown in FIG. 7, for a smaller junction box 41 of lesser height than the junction box 40 illustrated in FIG. 6, selected ones of the tabs 15 near where the junction box 41 is to be mounted may only be bent rearwardly by a slight angle in order to position tips of the tabs 15 against the upper and lower surfaces of the box, as shown in FIG. 8. Optionally, the tabs 15 may be spaced along the length of the cut out portion 27 at approximately 1-inch to 2-inch intervals to assure that a plurality of such tabs 15 can be selectively bent to engage upper and lower surfaces of a box 40, 41 located anywhere along the cutout portion 27.

The accompanying faceplate 60, or 'mud' ring, is preferably of standard construction having a central cut-out portion 64 and at least two holes aligned with the threaded holes 54 in extensions 52 of the junction box 40, 41. Thus, screws may be inserted through holes in the faceplate 60 and driven through the cut-out portion 26, 27 of the bracket 10, 13 into the threaded holes 54 of the box 40, 41 to fasten the faceplate 60 to the electrical box 40, 41 with the bracket 10, 13 'sandwiched' or compressed between the box 40, 41 and faceplate 60, as illustrated in FIGS. 5 and 8. The cut-out portion 64 in the faceplate 60 allows access to the interior of the box 40, 41 after the faceplate 60 is attached to the box 40, 41, and also facilitates surface mounting of switches, receptacles, and the like, against a finished wall of sheet rock 86.

Referring now to the side cross-sectional views of FIGS. 5 and 8, there are illustrated the brackets 10, 13 of the present invention mounting electrical boxes 40, 41 with corresponding faceplates 60. The bracket 10, 13 is first attached to the studs 7 by placing each of the elevated surfaces 24 against the front face of a corresponding wall stud, and inserting a screw or nail or other fastener through the hole 22 in each surface 24 and driving the fastener into each of the studs 7 to secure the bracket 10, 13 to the two studs. As attached, the front face of the bracket 10, 13 is substantially flush with a plane formed by the front faces of two adjacent studs. After the bracket 10, 13 is thus secured, an electrical box 40, 41 is placed against the rear of the bracket 10, 13 with the open front end of the box 40, 41 placed flush against the rear face of the bracket 10, 13. The upper and lower forward edges of the electrical box engage the upper and lower lineal shoulders 32, 34 at the rear face (formed by the upper and lower recesses, respectively, in the front face) or, alternatively, engage tabs 15 bent at right angle (or lesser angle) relative to the rear face of the bracket 10, 13. The faceplate 60 accompanying the box 40, 41 is placed against the front face of the bracket 10, 13 opposite the electrical box 40, 41. The faceplate 60 is aligned with the electric box 40, 41 with holes in the faceplate 60 aligned with the threaded holes 54 in the extensions 52 on the box 40, 41.

As shown in FIGS. 3 and 5, when the front or forward edges of a tall junction box 40 are placed against the rear face of the bracket 10, 13, a top forward edge of the box 40 contacts the top lineal shoulder 32 of the bracket 10, 13 and a bottom forward edge of the box 40 contacts the bottom lineal shoulder 34 of the bracket 10, 13. Alternatively, a shorter junction box 41, as shown in FIGS. 7 and 8, may contact selected tabs 15 bent suitably, as described above, to engage upper and lower surfaces of the box of smaller height dimensions.

The faceplate 60 is placed against the front face of the bracket with a top portion of the faceplate 60 in contact with the top member 28 of the bracket, and with a bottom portion of the faceplate 60 in contact with the bottom member 30 of the bracket 10, 13 with the bracket 10, 13 effectively sandwiched between the box 40, 41 and the faceplate 60 when in proper mounting position. To complete the mounting, bolts or screws 84 are inserted through the holes in the faceplate 60 and into the threaded holes 54 in the extensions 52 from the electrical box 40, 41 to fasten the box to the faceplate 60. Because the box 40, 41 and faceplate 60 sandwich the bracket 10, 13, fastening the box 40, 41 to the faceplate 60 also fastens the box 40, 41 and faceplate 60 to the bracket 10, 13. The electrical box is thus mounted onto the bracket 10, 13 and is restrained from rotating or otherwise disorienting the open front face of the box relative to the cut out portion 26, 27 of the bracket 10, 13 by the lineal shoulders 32, 34 and/or by the tabs 15 along the upper and lower edges of the bracket 10, 13.

Preferably, the screws 84 do not go through either the top member 28 or the bottom member 30 of the bracket 10, 13 but instead pass through the central cut-out portion 26, 27 of the bracket 10, 13. This obviates any need to drill holes into the bracket 10, 13. Because the screws 84 pass through the central cut-out portion 26, 27 and thus are not constrained by holes in the upper or lower members 28, 30, it is possible to slide the box 40, 41 and faceplate 60 along the length of the bracket 10, 13 to place the box 40, 41 and faceplate 60 at any desired position along the bracket 10, 13. In the embodiment of FIGS. 4, 5, 6, selected ones of the tabs 15 may be suitably bent rearwardly to engage the junction box 40, 41 wherever located along the length of the cut-out portion 26, 27 in order to stabilize the junction box 40, 41 against disorientation relative to the cut out portion 26, 27.

By repeating the mounting steps described above, a plurality of electrical boxes may be mounted onto a single bracket 10, 13. A bracket 10, 13 of the present invention may mount one or more electrical boxes in the manner described above, where each box may be of different width and different depth, and different height for common planar reference of the forward open face of each box at the planar orientation of the back face of the bracket 10, 13. Wallboard, or sheet rock, 86 is then attached to supporting studs with cut outs 88 suitably positioned therein to receive the faceplate, or 'mud' ring 60 in flush orientation of outer faces and edges, ready for application of conventional wallboard texturing compound, or 'mud', to fill cracks and seams.

What is claimed is:

1. A mounting assembly for attachment between two wall studs comprising:

an elongated frame having a front face, a rear face, first and second opposing ends attachable to said wall studs, and a central cut-out portion defining a top portion, a bottom portion and side portions thereof;

a plurality of upper tabs spaced-apart in the frame top portion and a plurality of lower tabs spaced-apart in the frame bottom portion for selectively protruding from a rear face at selected spaced-apart locations substantially along the length of the top and bottom portions between the side portions of the cut-out portion;

an electrical box having an upper surface and a lower surface terminating at respective upper and lower forward edges to define an open front end thereof, the front end of said box is further configured to be placed flush with the rear face of said frame with a portion of said box contacting the frame top portion and another portion of said box contacting the frame bottom portion, the upper tabs of said frame being oriented and of sufficient length to protrude from the rear face of the frame top portion to supportively engage the upper surface of the electric box, and the lower tabs of the frame being oriented and of sufficient length to protrude from the rear face of the frame bottom portion to supportively engage the lower surface of the electric box;

a faceplate positioned on the front face of said frame opposite and in alignment with said electrical box, with a portion of said faceplate contacting said top portion and another portion contacting said bottom surface of said frame; and a fastener inserted through said faceplate and cut-out portion for fastening said faceplate to said electrical box with the top portion and the bottom portion of the frame disposed between the forward edges of said box and said face plate.

2. The assembly of claim 1, wherein an upper region of said frame top portion is folded at a selected angle with respect to said rear face to form an upper shoulder protruding therefrom to provide enhanced structural rigidity.

3. The assembly of claim 2, wherein a bottom region of said frame bottom portion is folded at a selected angle with respect to said rear face to form a lower shoulder protruding therefrom to provide enhanced structural rigidity.

4. The assembly of claim 3, wherein the upper tabs extend downwardly from the upper shoulder of the top portion, the lower tabs extend downwardly from the lower shoulder of the bottom portion.

5. The assembly of claim 3, wherein the front face includes measurement marks along at least one of the top portion and bottom portion over substantially the length of the central cut-out portion.

6. The assembly of claim 1, wherein a plurality of selected tabs of the plurality of upper and lower tabs protrude from the rear face substantially perpendicular thereto to engage upper and lower surfaces of the electrical box.

7. The assembly of claim 1, wherein a plurality of selected tabs of the plurality of upper and lower tabs protrude from the rear face at an acute angle relative thereto to engage upper and lower surfaces of the electrical box.

8. A method for mounting between two wall studs an electrical box an upper surface and a lower surface terminating at respective upper and lower forward edges about an open face, the method comprising the steps of:

attaching to the wall studs an elongated frame having a front face, a rear face and a central cut-out portion defining a top portion and a bottom portion, each portion having a plurality of spaced-apart tabs protruding from the rear face along a portion of the length thereof near an upper edge of the top portion and near a lower edge of the bottom portion;

orienting a plurality of selected tabs of the plurality of spaced-apart tabs into supportive engagement with the respective upper and lower surfaces for aligning an open front of the electrical box with the central cut-out portion of the elongated frame;

placing a faceplate against the front face in engagement with the top and bottom portions opposite and in alignment with the electrical box; and positioning a fastener through the central cut-out portion between faceplate and electrical box for fastening the faceplate and electrical box together with the frame disposed therebetween for stabilizing the electrical box between the selected protruding tabs at a selected location along the lengths thereof and against disorientation of the open face of the electrical box relative to the central cut-out portion.

9. The method according to claim 8, wherein, said orienting step includes the step of bending the plurality of selected tabs to protrude from the rear face substantially perpendicular thereto to engage the respective upper and lower surfaces of the electrical box.

10. The method according to claim 8, wherein, said orienting step includes the step of bending the a plurality of selected tabs to protrude from the rear face at an acute angle relative thereto to engage the respective upper and lower surfaces of the electrical box.

11. The method according to claim 8 further including the step of folding an upper region of the frame top portion at a first selected angle with respect to said rear face to form an upper shoulder protruding therefrom to provide enhanced structural rigidity, and folding a bottom region of the frame bottom portion at a second selected angle with respect to said rear face to form a lower shoulder protruding therefrom to provide enhanced structural rigidity.

12. The assembly of claim 11, wherein the upper tabs extend downwardly from the upper shoulder of the top portion, the lower tabs extend downwardly from the lower shoulder of the bottom portion.

* * * * *